(12) United States Patent
Kim et al.

(10) Patent No.: US 10,331,229 B2
(45) Date of Patent: Jun. 25, 2019

(54) MOBILE TERMINAL AND METHOD FOR CONTROLLING THE SAME

(71) Applicant: LG ELECTRONICS INC., Seoul (KR)

(72) Inventors: Yongjae Kim, Seoul (KR); Suyoung Lee, Seoul (KR); Yoonchan Won, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 15/365,300

(22) Filed: Nov. 30, 2016

(65) Prior Publication Data

US 2017/0364164 A1 Dec. 21, 2017

(30) Foreign Application Priority Data

Jun. 21, 2016 (KR) .......................... 10-2016-0077586

(51) Int. Cl.
| | |
|---|---|
| *G06F 3/0346* | (2013.01) |
| *G06F 16/732* | (2019.01) |
| *G06F 3/0354* | (2013.01) |
| *G06F 3/0481* | (2013.01) |
| *G06F 3/0488* | (2013.01) |
| *G06F 17/21* | (2006.01) |
| *G06F 1/16* | (2006.01) |

(Continued)

(52) U.S. Cl.
CPC .......... *G06F 3/0346* (2013.01); *G06F 1/1626* (2013.01); *G06F 3/017* (2013.01); *G06F 3/03545* (2013.01); *G06F 3/046* (2013.01); *G06F 3/0488* (2013.01); *G06F 3/04815* (2013.01); *G06F 3/04817* (2013.01); *G06F 3/04883* (2013.01); *G06F 16/7328* (2019.01); *G06F 17/212* (2013.01); *G11B 27/102* (2013.01); *G11B 27/34* (2013.01); *H04N 21/41407* (2013.01); *H04N 21/4314* (2013.01); *H04N 21/47205* (2013.01); *G06F 2203/04101* (2013.01); *G06F 2203/04808* (2013.01)

(58) Field of Classification Search
CPC combination set(s) only.
See application file for complete search history.

(56) References Cited

U.S. PATENT DOCUMENTS

2013/0322844 A1 12/2013 Suzuki et al.
2013/0329109 A1 12/2013 Park et al.
(Continued)

FOREIGN PATENT DOCUMENTS

EP 2538688 A2 12/2012
KR 10-2015-0080480 A 7/2015

*Primary Examiner* — Robin J Mishler
(74) *Attorney, Agent, or Firm* — Birch, Stewart, Kolasch & Birch, LLP

(57) ABSTRACT

A mobile terminal including a touch screen configured to display a video and a search bar for searching the video; a plurality of magnetic sensors configured to sense a spatial position of an input device including a magnetic field generator; and a controller configured to in response to a first touch input applied to the search bar using the input device, display a preview image at a play time point corresponding to the first touch input on the touch screen, and change a viewing angle of the preview image based on the sensed spatial position of the input device indicating the input pen is pulled away from the touch screen and spatially moved with respect to the touch screen.

20 Claims, 15 Drawing Sheets

(51) Int. Cl.
  *G06F 3/01*      (2006.01)
  *G06F 3/046*     (2006.01)
  *H04N 21/414*    (2011.01)
  *H04N 21/431*    (2011.01)
  *H04N 21/472*    (2011.01)
  *G11B 27/10*     (2006.01)
  *G11B 27/34*     (2006.01)

(56) References Cited

U.S. PATENT DOCUMENTS

2015/0015741 A1* 1/2015 Kim .................. H04N 5/23293
                                                          348/239
2016/0299606 A1   10/2016 Go
2017/0244959 A1*  8/2017 Ranjeet ............ G08B 13/19641

* cited by examiner

FIG. 3B
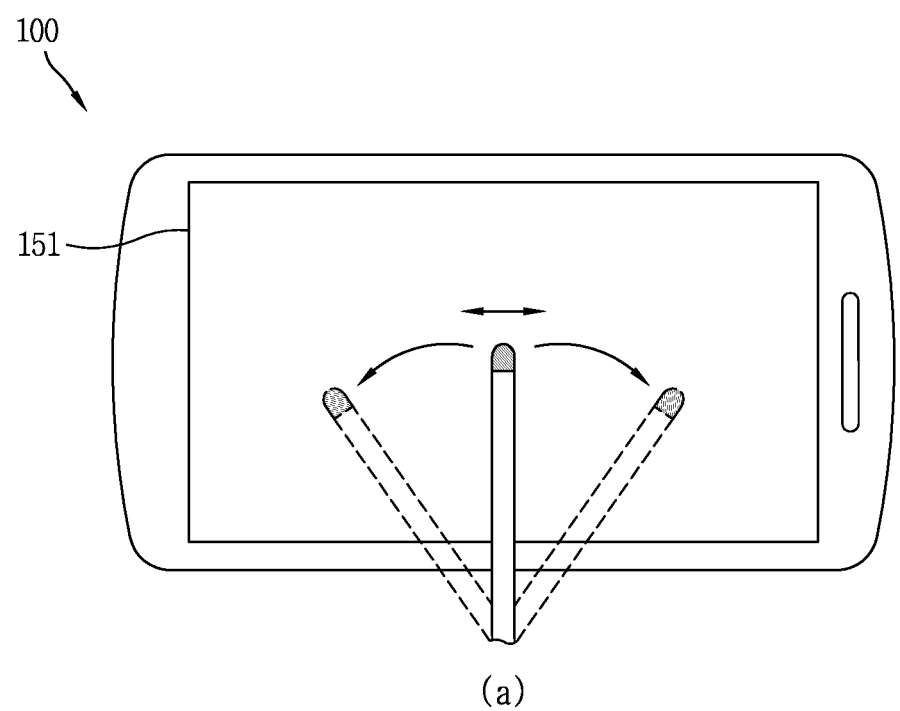
(a)
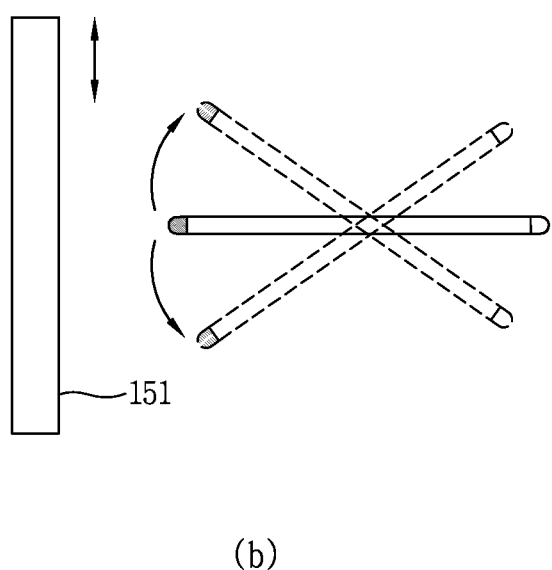
(b)

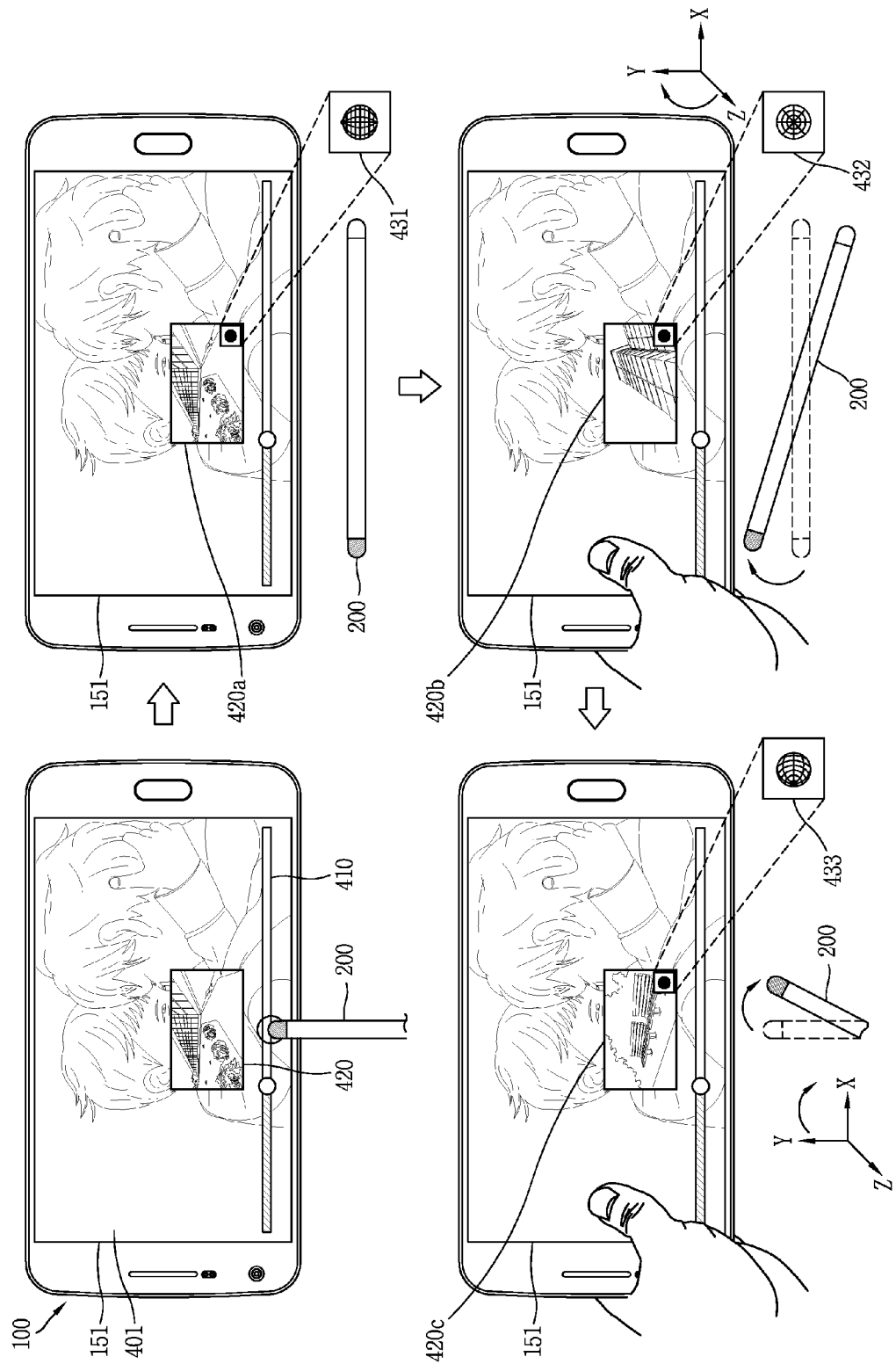

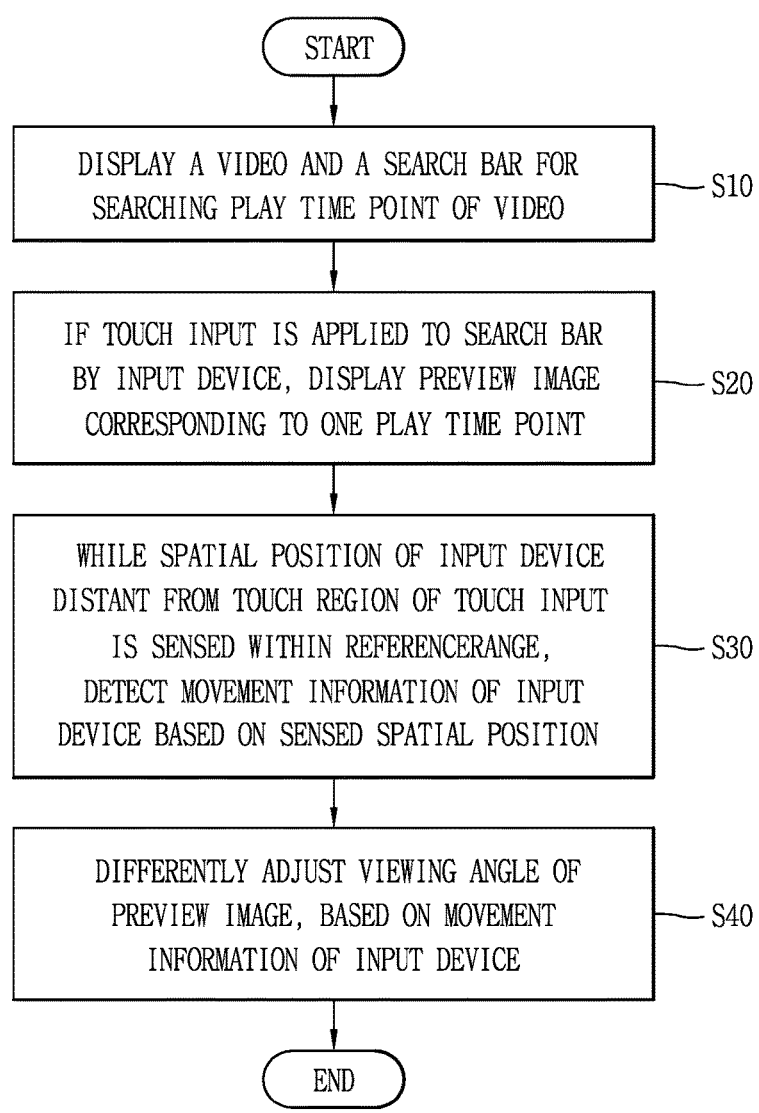

MOBILE TERMINAL AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0077586, filed on Jun. 21, 2016, the contents of which are incorporated by reference herein in their entirety.

BACKGROUND OF THE INVENTION

1. Field of the Invention

This specification relates to a mobile terminal capable of executing an input using an input device, and a method for controlling the same.

2. Background of the Invention

Terminals may be generally classified as mobile/portable terminals or stationary terminals. Mobile terminals may also be classified as handheld terminals or vehicle mounted terminals.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can capture still images or moving images, play music or video files, play games, receive broadcast and the like, so as to be implemented as an integrated multimedia player. As an example of such functions, a user can input a control command to a display of the mobile terminal, using a tool such as a stylus pen, rather than using his or her finger. In case of executing a writing operation using a tool, a position of the tool may be recognized by sensors provided at the mobile terminal, based on an input applied to the display.

In the related art, an input is applied in a restricted manner. That is, a specific object may be selected as a user touches a screen using a tool, or the screen may be zoomed-in or zoomed-out. For instance, another region may be checked from an image or a video captured at 360° through a touch input using a finger or a touch input using a tool. In this instance, the touch input using a finger and the touch input using a tool are similar to each other.

SUMMARY OF THE INVENTION

Therefore, an aspect of the detailed description is to provide a mobile terminal capable of rapidly checking a different viewing angle using an input device while an image or a video captured at 360° is being displayed, and a method for controlling the same.

Another aspect of the detailed description is to provide a mobile terminal capable of checking all viewing angles of an image at a specific play time point, or capable of easily changing a current viewing angle of a preview image to another viewing angle, while an image or a video captured at 360° is being displayed, and a method for controlling the same.

To achieve these and other advantages and in accordance with the purpose of this specification, as embodied and broadly described herein, there is provided a mobile terminal, comprising: a touch screen configured to display a video and a search bar for searching the video; a plurality of magnetic sensors configured to sense a spatial position of an input device including a magnetic field generator; and a controller configured to: in response to a first touch input applied to the search bar using the input device, display a preview image at a play time point corresponding to the first touch input on the touch screen, and change a viewing angle of the preview image based on the sensed spatial position of the input device indicating the input pen is pulled away from the touch screen and spatially moved with respect to the touch screen.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 3A and 3B are exemplary views illustrating an operation to control a screen based on a spatial position of an input device, in a mobile terminal according to an embodiment of the present invention;

FIG. 4 is a conceptual view illustrating a representative operation of a mobile terminal according to an embodiment of the present invention;

FIG. 5 is a flowchart illustrating the operation of FIG. 4; and

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1A:
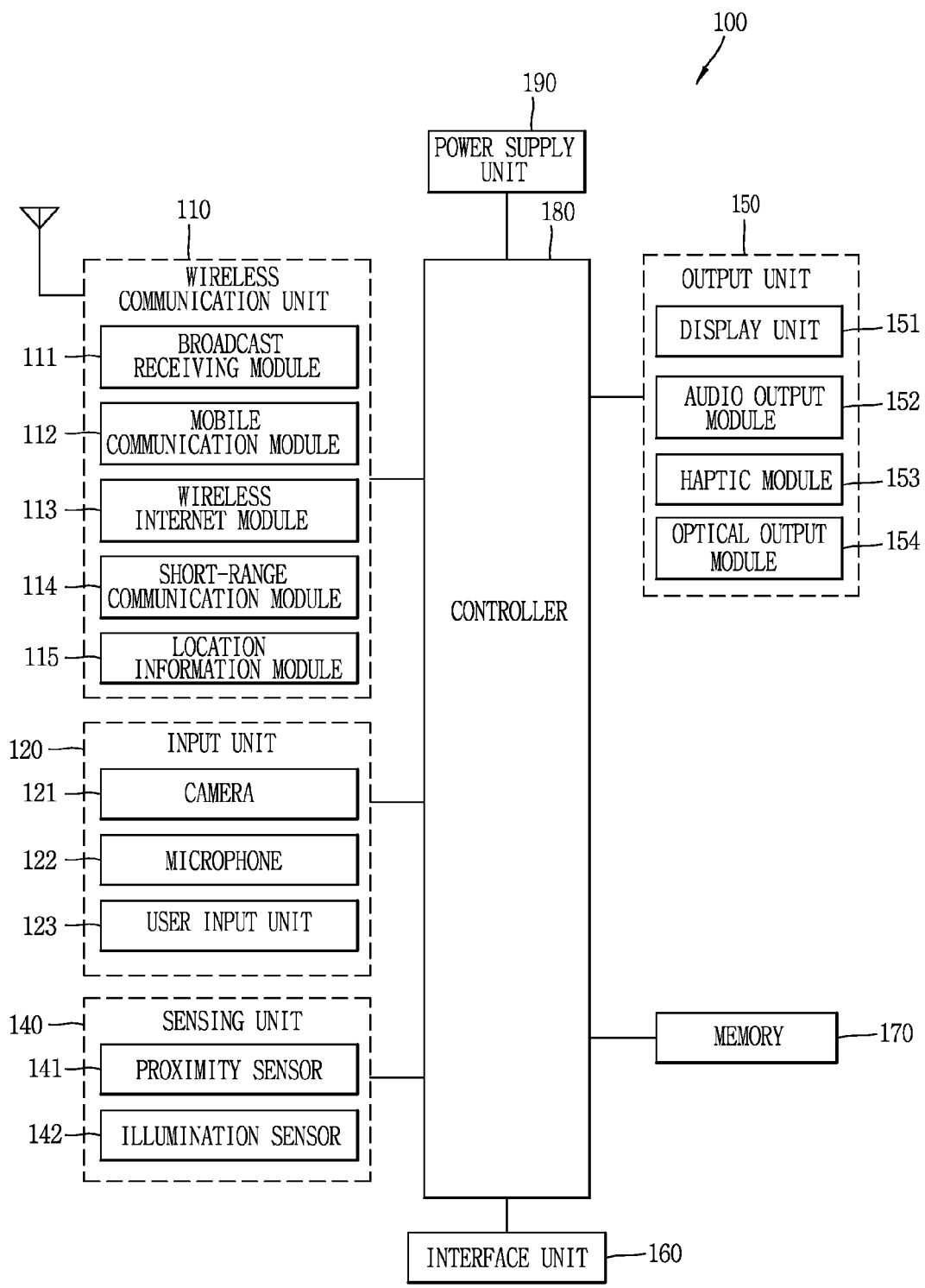
FIG. 1A is a block diagram of a mobile terminal according to an embodiment of the present invention.
Figure 1B:
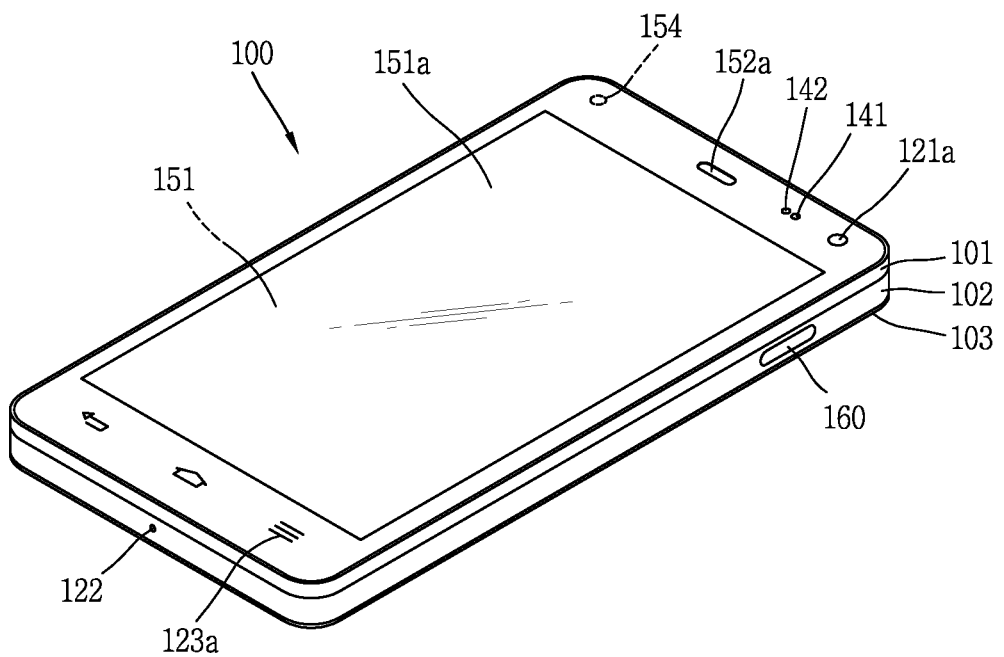
FIGS. 1B and 1C are conceptual views of one example of a mobile terminal according to an embodiment of the present invention, which are viewed from different directions.
Figure 1C:
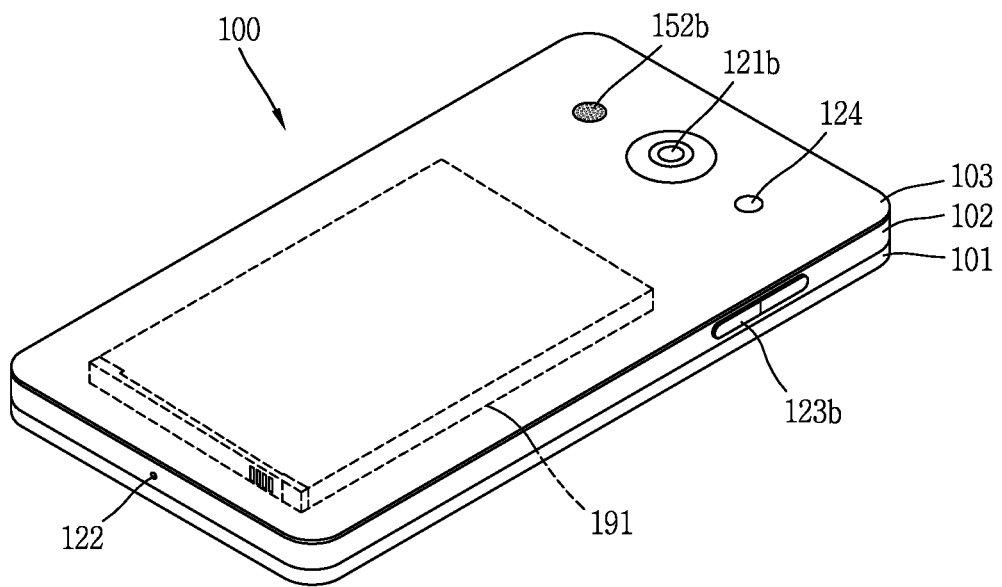

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor 143, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 can perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

A magnetic sensor 143 indicates a sensor configured to detect an object approaching a predetermined surface or an object which exists nearby, and a position and a direction of the object, using a force of a magnetic field. That is, the magnetic sensor 143 indicates a sensor configured to measure a size and a direction of a peripheral magnetic field or a line of magnetic force. In the present invention, a plurality of 3-axis magnetic sensors 143a, 143b are provided at the mobile terminal 100 to more precisely sense a position and a direction of an object which generates a magnetic field.

For this, the plurality of 3-axis magnetic sensors 143a, 143b may be independent from each other, and may be spaced from each other in different directions. The controller 180 can execute a differentiated operation based on a size of a magnetic field measured by the plurality of 3-axis magnetic sensors 143a, 143b. More specifically, the controller 180 can detect a position, a direction, an angle, etc. of an object which generates a magnetic field, based on a size of a magnetic field measured by the plurality of 3-axis magnetic sensors 143a, 143b.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 can include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 can also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 can alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 can be configured such that one case forms the inner space. In this example, a mobile terminal 100 having a uni-body is formed so synthetic resin or metal extends from a side surface to a rear surface.

If desired, the mobile terminal 100 can include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. A third camera may be further provided on a front surface of the terminal body. In this instance, the third camera may be disposed near the first camera 121a, or near the opposite side to the first camera 121a (i.e., the optical output unit 154).

The third camera may be provided with a wide angle lens. In this instance, the third camera may support a wider viewing angle than the first camera 121a. In a general angle mode, the first camera 121a may be activated for capturing. In a wide angle mode, the third camera may be activated for capturing. An image captured by the third camera may include a larger number of subjects than an image captured by the first camera 121a. However, in this instance, distortion occurs toward a peripheral part of a frame.

The third camera may be activated together with or independently from the first camera 121a when the first camera 121a is activated. If the third camera is activated together when the second camera 121b formed on a rear surface of the terminal body is activated, an image captured by the third camera may be used to compensate for a white balance reference value of an image captured by the first camera 121a.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 can include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body and can implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 can include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 can be provided. The cover or pouch may cooperate with the display unit 151 to extend the function of the mobile terminal 100. Another example of the accessory is a touch pen for assisting or extending a touch input to a touch screen.

Figure 2A:
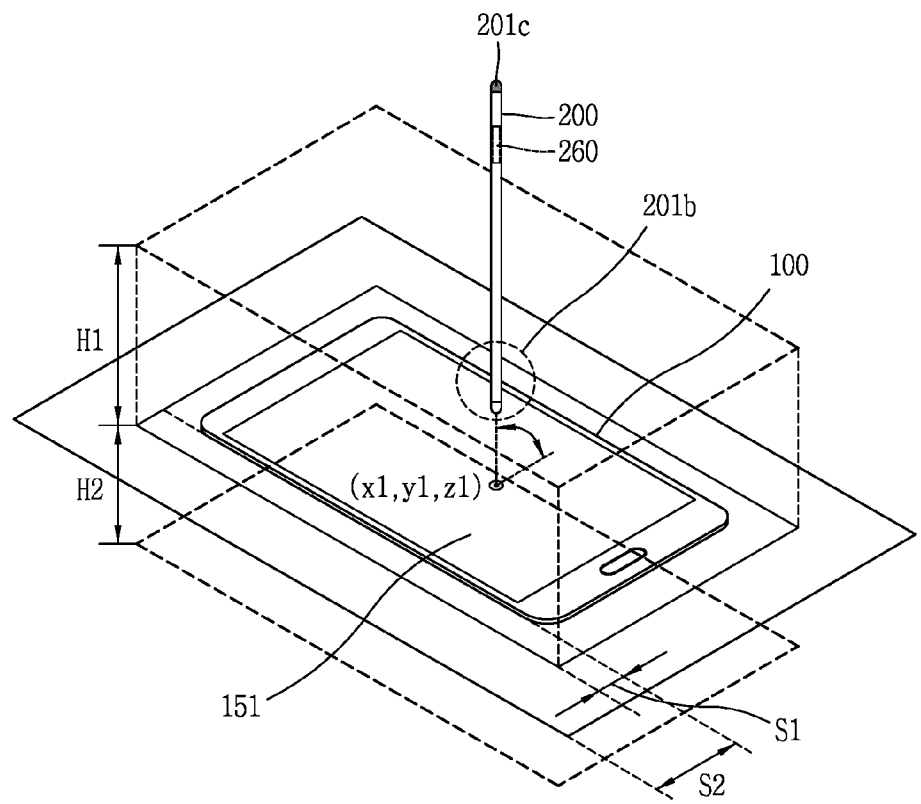
FIGS. 2A and 2B are views illustrating an operation to sense a spatial position of an input device, using a plurality of magnetic sensors in a mobile terminal according to an embodiment of the present invention.
Figure 2B:
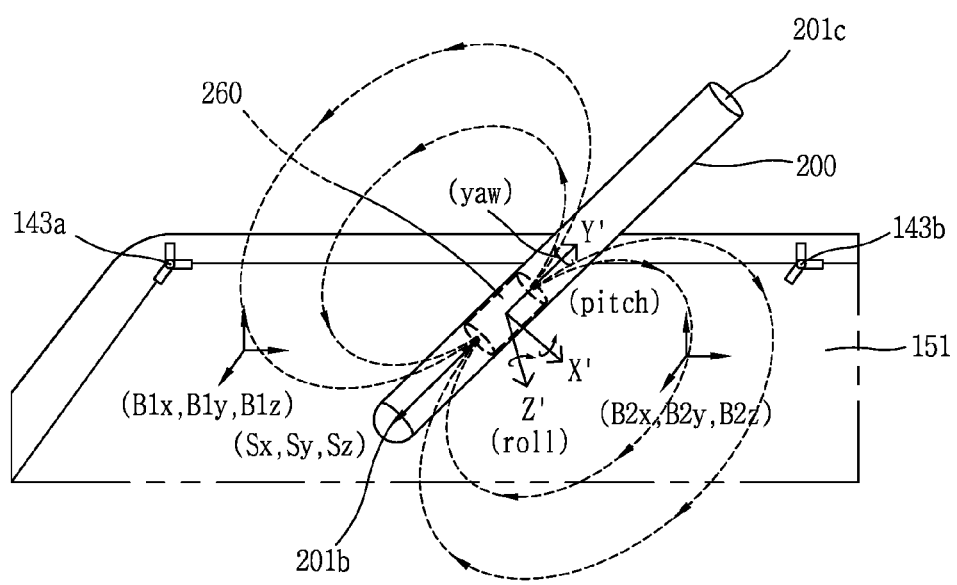

Next, FIGS. 2A and 2B are views illustrating an operation to sense a spatial position of an input device, using a plurality of magnetic sensors in the mobile terminal according to an embodiment of the present invention. As shown in FIGS. 2A and 2B, the mobile terminal 100 cancan recognize points (Sx, Sy, Sz) where the input device 200 contacts the touch screen 151, or 3D points (x1, y1, z1) out of the touch screen 151 within a reference range, i.e., spatial positions near the mobile terminal 100, by using a plurality of 3-axis magnetic sensors 143a, 143b.

As shown in FIG. 2B, the 3-axis magnetic sensors 143a, 143b can be spaced from each other at regions of corners of one edge of the mobile terminal 100. However, the present invention is not limited to this. That is, the 3-axis magnetic sensors 143a, 143b may be spaced from each other at different edges of the mobile terminal 100. Alternatively, the same effect as the 3-axis magnetic sensors 143a, 143b may be provided as at least two mobile terminals 100 are disposed to contact each other, each mobile terminal having a single 3-axis magnetic sensor.

Each of the 3-axis magnetic sensors 143a, 143b may measure a size of a magnetic field in directions perpendicular to each other. For instance, the first magnetic sensor 143a measures a size of a peripheral magnetic field in directions of x, y and z axes, thereby obtaining magnetic field values (B1$x$, B1$y$, B1$z$). And the second magnetic sensor 143b measures a size of a peripheral magnetic field in directions of x, y and z axes, thereby obtaining magnetic field values (B2$x$, B2$y$, B2$z$). Based on the obtained magnetic field values (B1$x$, B1$y$, B1$z$, B2$x$, B2$y$, B2$z$), a position, a direction and an angle of the input device 200 which generates a magnetic field may be detected.

For this, a magnetic field generator 260 for generating a magnetic field, i.e., a dipole magnet is provided in the input device 200. The magnetic field generator 260 may be installed such that a rotation center axis of the input device 200 may be consistent with an axis of the dipole magnet (Y', refer to FIG. 2B). In this instance, the degree of freedom of the magnetic field generator 260 by a position and a direction may be 5, i.e., a central position of the dipole magnet (x, y, z), and a roll and a pitch (a rotation angle with respect to X' and Z' axes independent from the Y' axis). A yaw of the input device 200 and the magnetic field generator 260 having the Y' axis as a center does not make a difference to a magnetic field sensing value of the magnetic field generator 260.

In the present invention, since 6 magnetic field values may be obtained through the plurality of 3-axis magnetic sensors, a position, a direction, and an angle of the magnetic field generator 260 which has 5 degrees of freedom may be specified. For this, a non-linear function, which describes a correlation among a central position (x, y, z) of the magnetic field generator 260, a spatial position of the input device 200 corresponding to a degree of freedom of a rotation angle (a roll and a pitch), and magnetic field values (B1$x$, B1$y$, B1$z$, B2$x$, B2$y$, B2$z$) sensed by the 3-axis magnetic sensors 143a, 143b, may be pre-stored in the mobile terminal 100 in the form of software.

In an embodiment, for sensing a spatial position of the input device 200, an acceleration sensor, a gyroscope, a camera, etc. as well as the 3-axis magnetic sensors may be further provided. Once the magnetic field values obtained by the plurality of 3-axis magnetic sensors are transmitted to the controller 180, the controller 180 can check a spatial position of the input device 200, and may output related information to the touch screen 151.

FIG. 2A illustrates recognition ranges (H1, H2; S1, S2) of a spatial position of the input device 200, the spatial position sensed near the mobile terminal 100. More specifically, a spatial position of the input device 200 having therein the magnetic field generator 260 may be sensed in an upper space (H1), a lower space (H2) and side spaces (S1, S2) based on the touch screen 151 of the mobile terminal 200 (hereinafter, will be referred to as 'reference range'). For instance, even if the input device 200 is positioned near a rear surface of the mobile terminal 100 within the reference range, the controller 180 can output an indication corresponding to the spatial position, to the touch screen 151.

Recognizing a spatial position of the input device 200 may be understood as recognizing hovering of the input device 200. A width, a height, a size, etc. of the reference range may be changed according to a size of a magnetic field generated from the magnetic field generator 260 provided at the input device 200, i.e., intensity of a magnetic field by the number of dipole magnets, a size of the dipole magnet, etc. For instance, as the intensity of a magnetic field of the dipole magnet is increased, a recognition range of a spatial position of the input device 200 may be widened.

As shown in FIG. 2B, if one end 201b of the input device 200 contacts one point of the touch screen 151, positions (Sx, Sy, Sz) pressed by the one end 201b may be sensed through the touch screen 151. In this instance, a position, a direction and an angle of the input device 200 may be precisely measured by a single 3-axis magnetic sensor. While a writing operation is executed on the touch screen 151 by using the input device 200, the controller 180 can ignore a touch input by a hand which is holding the input device 200.

In the present invention, a calibration process to remove/consider a magnetic field (hereinafter, will be referred to as 'environmental magnetic field') due to a terrestrial magnetic field, a sensor offset, noise occurring from peripheral alternating current power lines, etc. is initially executed once. More specifically, in the present invention, a change of a magnetic field is measured based on a magnetic field value corresponding to an initial position, a direction and an angle of the input device 200 sensed by the plurality of 3-axis magnetic sensors. Thus, even if a spatial position of the input device 200 is changed, an additional subsequent calibration process is not required.

Figure 3A:
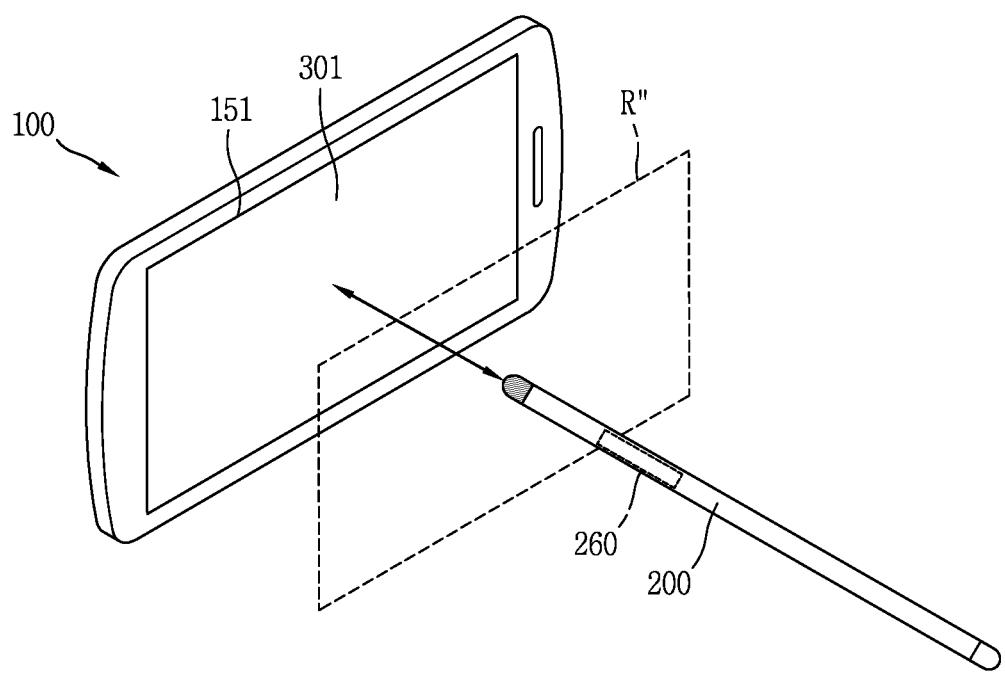

Next, FIGS. 3A and 3B are exemplary views illustrating an operation to control a screen based on a spatial position of the input device, in the mobile terminal according to an embodiment of the present invention. Referring to FIG. 3A, the mobile terminal 100 can estimate a 3D spatial position of the input device 200 having therein the magnetic field generator 260 (hereinafter, will be referred to as 'spatial position'), the spatial position above or below the touch screen 151 within a reference range.

For this, as aforementioned, the mobile terminal 100 can sense a change of a magnetic field value of the input device 200 which moves on a virtual surface (R") parallel to the touch screen 151 and disposed within a reference range, using the plurality of 3-axis magnetic sensors 143a, 143b provided therein. Then, the mobile terminal 100 can transmit the sensed change of the magnetic field value to the controller 180. Then, the controller 180 can specify a position, a direction and an angle of the magnetic field generator 260 which has 5 degrees of freedom, based on the change of the magnetic field value, thereby sensing a spatial position of the input device 200. That is, even when the input device 200 is in a non-contacted state to the touch screen 151, a spatial position of the input device 200 may be continuously sensed by using the plurality of 3-axis magnetic sensors 143a, 143b.

In this instance, a spacing distance between the virtual surface (R") disposed within a reference range and the touch screen 151, may be determined in proportion to a size of a magnetic field generated from the magnetic field generator 260. For instance, when the size of a magnetic field generated from the magnetic field generator 260 is increased, a range to recognize a spatial position of the input device 200, i.e., a spacing distance between the virtual surface (R") and the touch screen 151 may be increased.

In addition, a graphic object (e.g., a cursor) which moves along a spatial position of the input device 200 or which forms a moving path may be displayed on a screen 301 at a point of on the touch screen 151 (e.g., a value of a Z axis is 0), the point corresponding to a position vertically and downward spaced from the spatial position of the input device 200.

The controller 180 of the mobile terminal 100 can continuously detect movement information of the input device 200 in a 3D space, such as a moving path, a moving direction (including rotation), a tilted degree and an inclination direction, by consecutively calculating coordinate values of a next spatial position, based on coordinate values of an initial (or previous) spatial position of the input device 200.

The controller 180 can specify a reference point on the touch screen 151, based on the initial spatial position of the input device 200. In addition, the controller 180 can control the screen 301 displayed on the touch screen 151 to correspond to the movement information of the input device 200, based on the specified reference point.

The reference point is determined based on a tilted degree of a rotation angle (a roll and a pitch) of the magnetic field generator 260. For instance, when the rotation angle (the roll and the pitch) of the magnetic field generator 260 is 0 or is close to 0, i.e., when the input device 200 is moved to a Z-axis from a touch point on the touch screen 151 in a non-inclined state, the reference point may be a point on the touch screen 151 below an initial spatial position of the input device 200 in a vertical direction. Further, when the rotation angle (the roll and the pitch) of the magnetic field generator 260 is sensed, i.e., when the input device 200 is moved to an X-axis and a Y-axis as well as a Z-axis from a touch point on the touch screen 151, the reference point may be specified or changed based on an angle (theta) between an initial spatial position of the input device 200 and a normal line of the touch screen 151.

The controller 180 can control the screen 301 displayed on the touch screen 151 and may determine a control direction, based on a specific reference point. An example thereof is illustrated in FIG. 3B. For instance, in case of moving the input device 200 right and left based on an X-axis while stopping in a Z-axis direction within a reference range, or in case of moving the rotation angle (the roll and the pitch) of the magnetic field generator 260 right and left (a), a screen change corresponding to the right and left movement based on a specific reference point, i.e., a screen change to display a non-displayed right and left region may be displayed on the touch screen 151.

As another example, in case of moving the input device 200 up and down based on a Y-axis while stopping in a Z-axis direction within a reference range, or in case of moving the rotation angle (the roll and the pitch) of the magnetic field generator 260 up and down (b), a screen change corresponding to the up and down movement based on a specific reference point, i.e., a screen change to display a non-displayed upper and lower region may be displayed on the touch screen 151.

On the touch screen 151 of the mobile terminal 100 according to an embodiment of the present invention, a search bar to search a video and a play time point of the video may be displayed. In addition, the touch screen 151 may sense a touch input applied to the search bar.

Once a touch input is applied to the search bar by using the input device 200, the controller 180 can display a preview image at a play time point corresponding to a touch region of the touch input, on the touch screen 151. The preview image may be output to an entire region of the touch screen 151 (in this instance, a video being currently displayed is replaced by the preview image). Alternatively, the preview image may be output to a position of the search bar which corresponds to the touch point, in the form of a thumbnail.

In the present invention, it is assumed that the video has been captured at 360° (or 180°). Alternatively, the video and the preview image may be displayed based on a first region among an entire region of the video which has been captured at 360° (or 180°). Alternatively, one of the video and the preview image may be displayed based on a first region, and another thereof may be displayed based on a second region. In the former case, the same viewing angle is implemented. On the contrary, in the latter case, different viewing angles are implemented.

While the input device 200 is sensed within a reference range in a distant state from the touch region on the touch screen 151 based on a Z-axis, when the preview image at a play time point has been displayed, the controller 180 can continuously sense movement information of the input device 200 (e.g., a movement (including a rotation), a moving direction, a tilted degree and an inclination direction), based on a sensed spatial position.

Here, the reference range means a range to recognize a spatial position of the input device 200, by a plurality of 3-axis magnetic sensors provided at the mobile terminal 100. Thus, if a spatial position of the input device 200 is not sensed any longer, the controller 180 can determine that the input device 200 is out of the reference range. And a state where a spatial position of the input device 200 becomes far from the touch screen 151 based on Z-axis, may be regarded as an operation to upward pull the input device 200.

Then, the controller 180 can differently control a viewing angle of a preview image displayed on the touch screen 151, based on movement information of the input device 200. More specifically, the controller 180 can specify a reference point on the touch screen 151, based on an initial spatial position of the input device 200. Further, the controller 180 can change a viewing angle of a preview image based on the reference point, the preview image displayed based on movement information of the input device 200 by a change of a spatial position (e.g., a tilted degree and an inclination direction of the input device 200).

For instance, a preview image displayed based on a first region may be displayed based on a second region, as a spatial position of the input device 200 is changed. The second region may be determined based on a specific reference point and movement information of the input device 200.

Also, when a preview image has been displayed based on a first region, if the input device 200 is rapidly rotated up and down and right and left in a space within a reference range, the preview image is rapidly changed based on upper, lower, right and left regions. This allows a user to rapidly check all viewing angles at a corresponding play time point.

As aforementioned, in the present invention, while a video captured at 360° (or 180°) is being played, if the input device contacting one point on a search bar is pulled upward based on a Z-axis and then is inclined up and down and right and left, other viewing angles of a displayed preview image may be recognized easily and rapidly.

Next, FIG. 4 is a conceptual view illustrating a representative operation of the mobile terminal 100 according to an embodiment of the present invention. As shown in FIG. 4, a search bar 410 for searching a video 401 captured at a viewing angle of 360° (or 180°~360°) and for searching a specific play time point of the video is displayed on the touch screen 151 of the mobile terminal 100.

Then, if a touch input is applied to one point on the search bar 410 by using the input device 200, a preview image 420 at a play time point corresponding to the touch point is displayed. In this state, if the input device 200 is pulled upward within a reference range, a first icon 431 indicating a current viewing angle of the displayed preview image 420 can be displayed within the preview image 420 (420*a*). Alternatively, after a touch input applied to one point on the search bar 410 by using the input device 200 is maintained for a predetermined time, if the input device 200 is pulled upward within a reference time for a preset trigger posture, a first icon 431 indicating a current viewing angle of the displayed preview image 420 may be displayed.

In this state, if the user applies a touch input (hereinafter, will be referred to as 'second touch') to the touch screen 151 using his or her finger, the displayed state of the preview image 420 is maintained. More specifically, while the second touch input is maintained, the preview image 420 can be displayed on the entire region of the touch screen 151 as a still image, or may be fixed onto the search bar 410.

Then, the controller 180 continuously detects movement information of the input device 200 (e.g., a movement or a rotation of the input device 200, a moving direction or a rotation direction, a moving speed or a rotation speed, a tilted degree, and an inclination direction), based on a spatial position of the input device 200 at a time point when the first icon 431 has been displayed (e.g., a spatial position corresponding to a trigger posture of the input device 200).

Once a clockwise rotation of the input device 200 based on a Y-axis by a predetermined angle (e.g., 30°~45°) is detected as movement information while the second touch input is maintained, the controller 180 can change a viewing angle of the preview image 420*a* in correspondence to the movement information of the input device 200 (420*b*). Then, the controller 180 can display a second icon 432 indicating the changed viewing angle, within the preview image 420*b*.

Once a clockwise rotation of the input device 200 based on an X-axis by a predetermined angle (e.g., 15°~30°) is detected as movement information, the controller 180 can change the viewing angle of the preview image 420*a* in correspondence to the movement information of the input device 200 (420*c*). Then, the controller 180 can display a third icon 433 indicating the changed viewing angle, within the preview image 420*c*.

The first to third icons 431, 432, 433 are displayed in the form of spheres having different viewing angles. However, the present invention is not limited to this. That is, the first to third icons 431, 432, 433 may be displayed in the form of arrows, 3D shapes, etc. Alternatively, changed viewing angles may be notified through a voice prompt rather than icons.

In addition, in the displayed state of the preview image 420*b* or 420*c*, if a spatial position of the input device 200 is out of a reference range, the viewing angle of the preview image is fixed as a changed viewing angle. Thus, at a corresponding play time point, a video is played at the changed viewing angle.

As aforementioned, in the present invention, as the input device 200 is moved in a space distant from the touch screen 151, another viewing angle of a preview image corresponding to a specific play time point may be checked from a video captured at a viewing angle of 360° and being played, or a current viewing angle of the preview image may be rapidly changed to another viewing angle.

Next, FIG. 5 is a flowchart illustrating the operation of FIG. 4. Firstly, a search bar for searching a video and a specific play time point of the video is displayed on the touch screen 151 of the mobile terminal 100 (S10). Then, once a touch input is applied to the search bar by the input device 200 including the magnetic field generator 260, the controller 180 of the mobile terminal 100 can display a preview image at a play time point corresponding to the touch point, on the touch screen 151 (S20).

Here, the video is captured at a viewing angle of 360° (180°~360°), and the video and the preview image can be displayed based on a first region among an entire region of the video. While a spatial position of the input device 200 is sensed by the plurality of magnetic sensors 143a, 143b within a reference range in a distant state from the touch point on the touch screen 151 in a Z-axis direction, the controller 180 can continuously detect movement information of the input device 200, based on the sensed spatial position of the input device 200 (S30).

Here, the movement information of the input device 200 includes information on a movement, a rotation, an inclination, a direction and a speed of the input device 200. The controller 180 can display an indication corresponding to the obtained movement information, on the touch screen 151. Thus, a user can control next movement information of the input device 200, based on the displayed indication.

Based on the movement informant of the input device 200, the controller 180 can differently control a viewing angle of the displayed preview image (S40). More specifically, once the viewing angle of the preview image is changed based on a tilted degree and an inclination direction of the input device 200 among the obtained movement information, the controller 180 can display the preview image based on a second region different from the first region. That is, a screen corresponding to the first region of the preview image may disappear at least partially, and a screen corresponding to the second region (a hidden viewing angle) may be displayed at least partially.

In this instance, the controller 180 can control the current display state of the preview image to be maintained while a second touch input is being applied to the touch screen 151, such that the preview image may not be changed to another preview image at another play time point according to a movement of the input device 200. That is, the preview image may be fixed in a condition that the second touch input is additionally applied. Here, the fixing of the preview image means continuously maintaining an output position of the preview image on the search bar, or not changing the preview image into another preview image at another play time point.

In this instance, the second touch input should be maintained while the viewing angle of the preview image is differently controlled. More specifically, if the second touch input is released while the viewing angle of the preview image is controlled, the controller 180 can fix the viewing angle of the preview image into a viewing angle corresponding to a time point when the second touch input has been released.

The fixing of the viewing angle of the preview image means playing a video at a current viewing angle of the preview image when a corresponding play time point is reached, or maintaining the current viewing angle of the preview image despite a subsequent movement of the input device 200. For this, the controller 180 can store, in the memory 170, information on a viewing angle corresponding to a time point when the second touch input has been released, and a corresponding play time point. Once the second touch input is released, the preview image at a play time point may disappear from the screen, or the preview image at a play time point may be changed into another preview image at another play time point.

Once the preview image is displayed, the controller 180 can display a notification icon indicating the current viewing angle of the preview image, on the touch screen 151. In this instance, once the viewing angle of the preview image is changed based on the movement information of the input device 200, an image of the notification icon is changed. The change of the image of the notification icon means a change of the image of the notification icon in position, size, shape, color, etc., for visual recognition of the changed viewing angle.

The controller 180 can control a change degree of a next viewing angle, based on the viewing angle of the preview image corresponding to the current spatial position of the input device 200. More specifically, the controller 180 determines a first viewing angle corresponding to movement information of the input device 200, and changes a display state of the preview image in correspondence to the determined first viewing angle. Then, the controller 180 can determine a second viewing angle corresponding to next movement information of the input device 200, based on a spatial position of the input device 200 corresponding to the first viewing angle.

If a corresponding play time point is reached after at least one viewing angle of the preview image is changed, the controller 180 can detect information on the changed viewing angle from the memory 170, etc., and may play a video at the detected viewing angle.

Figure 6:
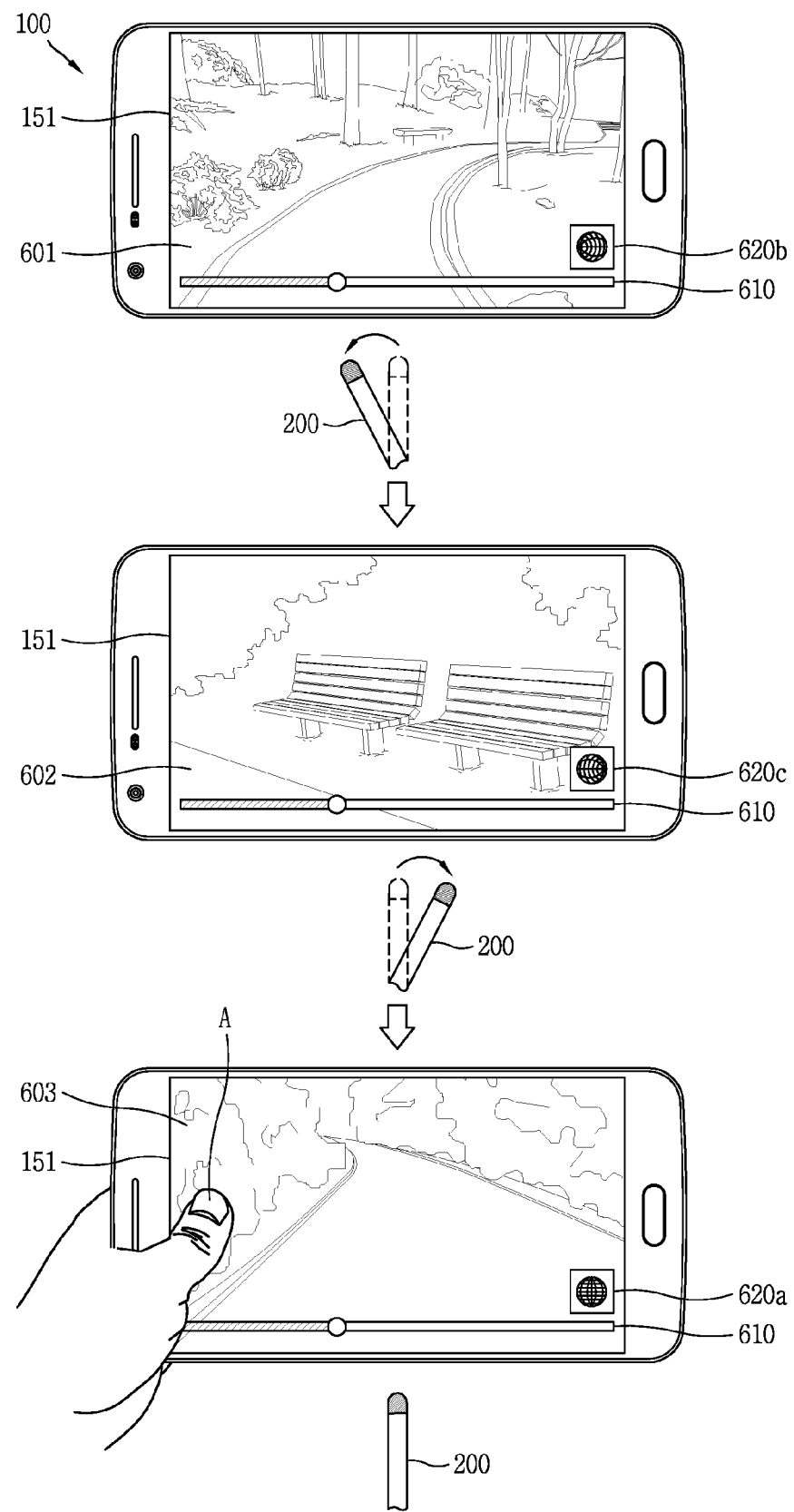
FIGS. 6 to 13 are views illustrating various examples to rapidly control a viewing angle of a displayed image captured at 360°, based on a spatial position of an input device, in a mobile terminal according to an embodiment of the present invention.

FIG. 6 illustrates an example to control a viewing angle of a video being currently displayed, not a preview image at a specific play time point, which illustrates that a changed viewing angle is initialized by a specific gesture input. In an embodiment, if a second touch input applied to the touch screen 151 is released while a viewing angle of a preview image is controlled, the controller 180 can fix the viewing angle of the preview image as a viewing angle corresponding to a time point when the second touch input has been released. And the controller 180 can differently control a viewing angle of a currently displayed video, based on subsequent movement information of the input device 200.

For instance, as shown in FIG. 6, as the second touch input is released, a preview image at a specific play time point on a search bar 610 disappears, and a video captured at 360° is continuously played. Then, a control command for controlling a viewing angle in correspondence to a subsequent movement of the input device 200 is applied to the currently displayed video captured at 360°.

More specifically, for instance, if the input device 200 is counterclockwise or leftward inclined by a predetermined angle (e.g., 15~30°) in a 3D space within a reference range, the controller 180 changes a viewing angle of the currently displayed video captured at 360° according to a movement of the input device 200. As a result, a video which was being played at a viewing angle of 360° based on a first region is played based on a second region different from the first region (601). In addition, a notification icon 620b indicating a changed viewing angle of the video is displayed on one region of the touch screen 151, e.g., above a right region of the search bar 610.

Then, once a clockwise or rightward inclination of the input device 200 by a predetermined angle (e.g., 15~30°) in the previous spatial space is detected as next movement information of the input device 200, the viewing angle of the video 601 which was being played based on the second region is changed once more into another viewing angle corresponding to the movement of the input device 200, i.e., a third region different from the second region (602). And the notification icon 620b is changed into a notification image 620c indicating the changed viewing angle.

If a preset gesture is input by the input device 200 while the viewing angle of the currently displayed video is changed, for instance, if the input device 200 is fixed for a reference time (e.g., 3 seconds) in a perpendicular state to the touch screen 151 when a touch input has been applied to the touch screen 151 as shown in FIG. 5, the controller 180 can initialize the changed viewing angle of the currently displayed video captured at 360°.

More specifically, the controller 180 can pre-store information on the viewing angle of the currently displayed video captured at 360° which corresponds to a spatial position of the input device 200, at a time point when the second touch input applied to the touch screen 151 is released while the viewing angle of the video captured at 360° is being controlled. Here, the stored information on the viewing angle means information on the original viewing angle of the video captured at 360° displayed based on the first region.

Then, if the aforementioned preset gesture is input by the input device 200 while the viewing angle of the currently displayed video captured at 360° is being changed, the controller 180 can convert the viewing angle of the currently displayed video in correspondence to the stored information. As a result, as shown in FIG. 6, the video is played in an initialized state with the original viewing angle (603). In this instance, a notification icon 620a indicating the initialized viewing angle may be displayed for a predetermined time, and then may disappear.

Such an initialization of a viewing angle may be also applicable to a case where a preset gesture is input while a viewing angle of the aforementioned preview image is being controlled. In addition, in another embodiment, even when the input device 200 is intentionally moved in a Z-axis direction such that a spatial position of the input device 200 is out of a reference range, while a viewing angle of a video being currently displayed, the video may be initialized to have the original viewing angle. Whether the spatial position of the input device 200 is out of the reference range or not may be determined according to whether a change speed of a magnetic field value sensed by a plurality of 3-axis magnetic sensors 143a, 143b is within a reference value (an intentional operation), or exceeds the reference value (an unintentional operation).

In the above embodiment, if a touch input applied to the touch screen 151 is maintained when the spatial position of the input device 200 is out of the reference range, the controller 180 can maintain the changed viewing angle of the video being currently displayed.

In this embodiment, while a viewing angle of a preview image or a video being currently displayed is changed many times by the input device 200, the changed viewing angle may be initialized to the original viewing angle at a time. As a result, a user needs not move the input device 200 minutely in order to return to the original viewing angle.

Figure 7:
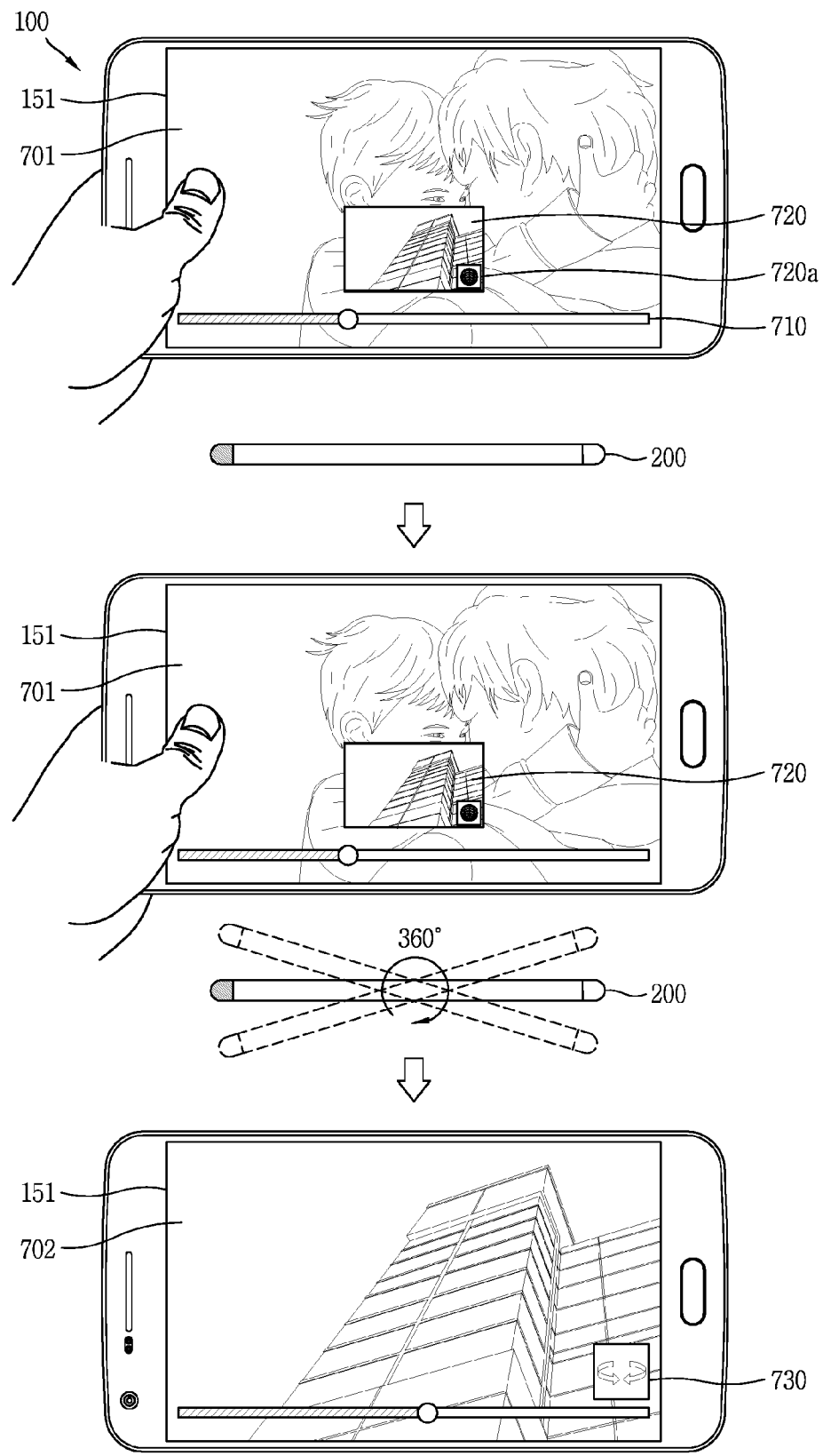

FIG. 7 is a view illustrating an embodiment to bookmark a play time point of a preview image having a changed viewing angle, using the input device 200. Firstly, if the input device 200 touching one point of a search bar 710 is pulled upward from the touch screen 151, a preview image 720 at a play time point corresponding to the touch point is displayed as shown in FIG. 7.

In the displayed state of the preview image 720 at a play time point, if the input device 200 is fixed to a space within a reference range for a predetermined time, the controller 180 can generate a trigger signal for controlling a viewing angle of the displayed preview image 720.

In response to the generated trigger signal, the controller 180 can display a notification icon 720a indicating a current viewing angle of the preview image 720. In an embodiment, the controller 180 can output a signal indicating that the mobile terminal has entered an operation mode for controlling a viewing angle of the preview image (e.g., a sound, a vibration, etc.).

If movement information of the input device 200 satisfies a preset condition after the trigger signal is generated, the controller 180 can bookmark a play time point corresponding to the preview image 720. More specifically, if a rotation of the input device 200 by 360° in one direction is detected as movement information, when a second touch input has been applied to the touch screen 151, the controller 180 can bookmark a play time point corresponding to the preview image 720. In this instance, information on the play time point and a viewing angle corresponding to the play time point may be stored in the memory 170. While such an operation is being executed, the video captured at 360° may be continuously played.

Next, if a spatial position of the input device 100 is out of a reference range, the bookmark operation at the play time point is completed. Then, if the bookmarked play time point is reached, an indicator 730 indicating the bookmarked image may be displayed on one region of the touch screen 151, i.e., above a right region of the search bar 710.

When executing a bookmark operation at another play time point, a touch input may be applied to another point on the search bar by using the input device 200, and the aforementioned operation may be executed. As a result, bookmark operations at a plurality of play time points may be consecutively executed. In this instance, while the bookmarked image is being displayed, a next bookmarked image may appear by a touch input applied to the indicator 730.

After a trigger signal for controlling a viewing angle of a preview image is generated, if a movement of the input device 200 satisfies a preset condition, a bookmark operation at a corresponding play time point may be executed while a current viewing angle at the corresponding play time point is maintained.

Figure 8:
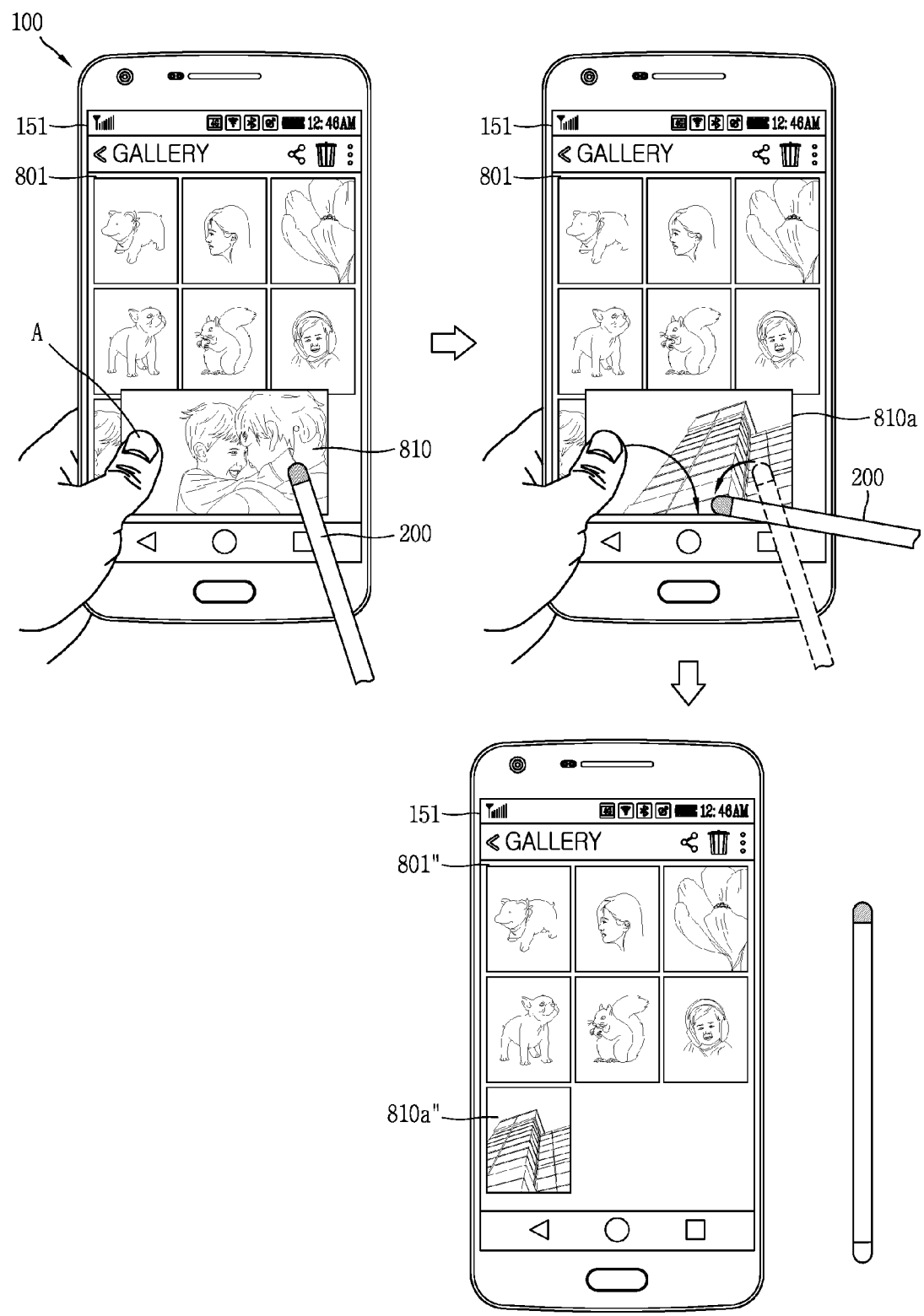

As another embodiment, as shown in FIG. 8, a viewing angle of a specific image may be controlled according to whether a touch input has been applied to the touch screen 151 or not. Here, the specific image may be an image captured at 180°~360°, which means an image including an invisible viewing angle as well as a displayed first region, i.e., an image including a first region and a second region.

For this, the controller 180 can provide an additional condition for controlling a viewing angle of a specific image 810 selected by the input device 200 from a list 801 including a plurality of images. More specifically, the controller 180 can control a viewing angle of a preview image based on movement information of the input device 200, while a touch input (A) is applied to one point on the touch screen 151 or one point on the image 810 for controlling a viewing angle as shown in FIG. 8. In this instance, while the touch input is being applied to the image 810 for controlling a viewing angle, the image 810 may be enlarged to be overlapped with at least part of the plurality of images.

As shown in FIG. 8, as the input device 200 is moved or inclined in an upper, lower, right or left direction within a reference range, a viewing angle of the image 810 may be changed in an upper, lower, right or left direction (810a). While the viewing angle of the image 810 is controlled, viewing angles of said other images included in the list 801 are maintained. In an embodiment, if the input device 200 is moved in an upper, lower, right or left direction within a reference range, when the touch input (A) has not been applied to one point on the image 810, viewing angles of all of the images included in the list 801 (captured at 180°~360°) may be simultaneously changed.

In addition, if the image 810 is an image captured at 180°, a notification icon indicating a changed viewing angle may be displayed in the form of a rightward or leftward arrow, etc., rather than a sphere. The notification icon may further inform a position of the changed viewing angle. The controller 180 can differently control a viewing angle of the image 810, according to a time point when the touch input (A) applied to the touch screen 151 or the image 810 has been released.

For instance, while the second touch input applied to the touch screen 151 or the image 810 is maintained, if a spatial position of the input device 200 is out of a reference range, the controller 180 fixes a viewing angle of the image 810 to a changed viewing angle. As a result, as shown in FIG. 8, as the touch input (A) is released, an image having the original size is fixed with the changed viewing angle (810a").

As another example, after the second touch input applied to the touch screen 151 or the image 810 is released, if a spatial position of the input device 200 is out of a reference range, the controller 180 converts or initialize a viewing angle of the image 810 to the original viewing angle. Alternatively, after the second touch input applied to the touch screen 151 or the image 810 is released, if a spatial position of the input device 200 is within the reference range, the controller 180 can initialize the image 810 to the original state, and then may control viewing angles of the entire images included in the list 801.

As another example, if a touch input is applied to a notification icon indicating a changed viewing angle, the controller 180 can fix the image 810 at a viewing angle corresponding to the notification icon, regardless of a time point when the second touch put applied to the touch screen 151 or the image 810 is released. In this embodiment, a touch input applied to the touch screen 151 or the image 810 is released at a different time point while a viewing angle of the image is controlled by the input device 200. This allows a different input related to the control of the viewing angle, to be generated.

Figure 9:
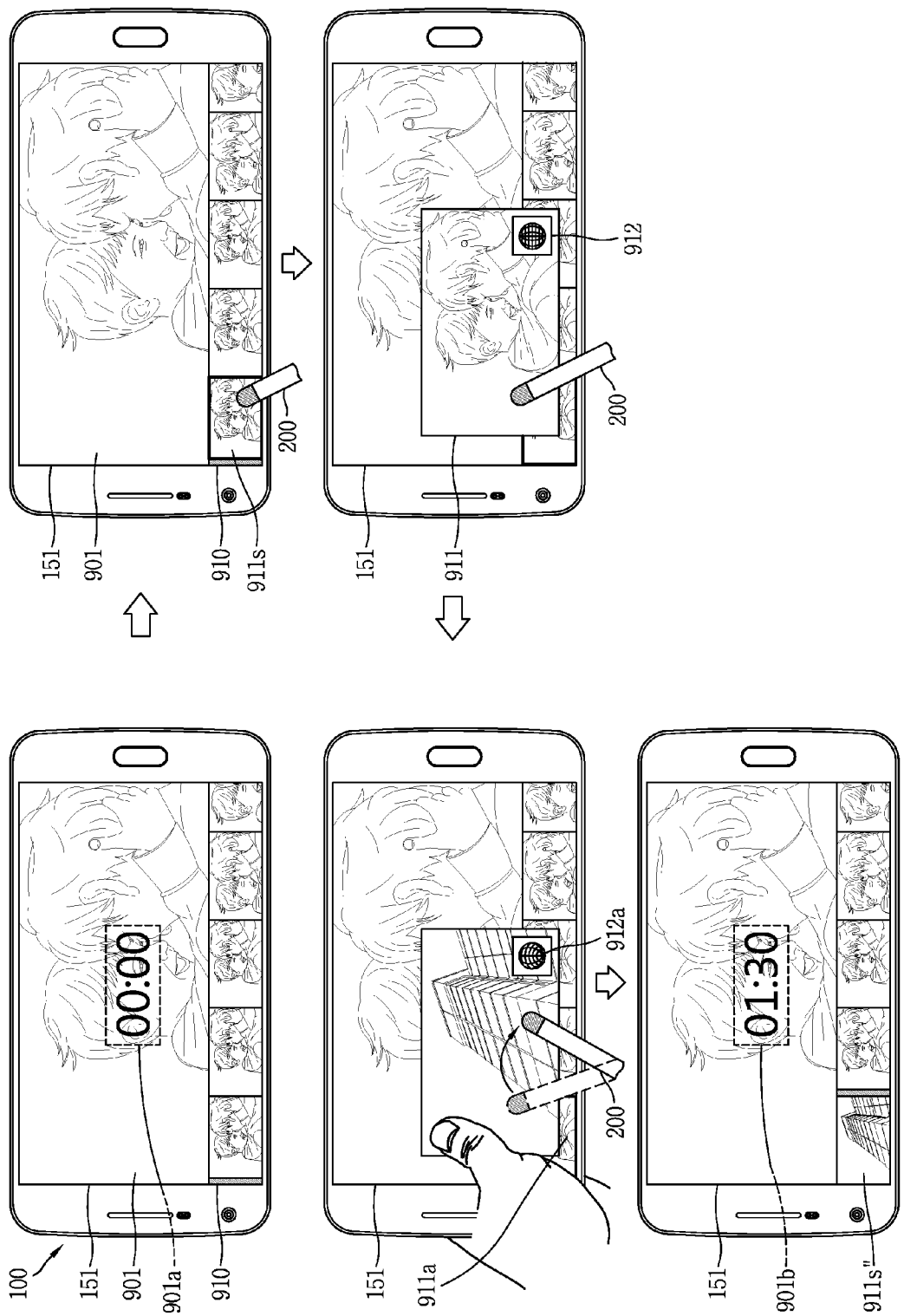

Next, FIG. 9 is a view illustrating an example to generate a planar video by changing viewing angles of preview images corresponding to a plurality of play time points, in a video edition mode. As shown in FIG. 9, in an edition mode, a video 901 temporarily stopped can be displayed on an entire region of the touch screen 151, and a list 910 of preview image corresponding to a plurality of play time points may be displayed at a lower end of the touch screen 151. Further, information 901a on a play time of a preview image being edited may be displayed on a middle region of the video 901.

For instance, if a preview image 911s of a first section is selected from the list 910 by the input device 200, the mobile terminal 100 enters an operation mode for changing a viewing angle of the preview image 911s. As a result, the preview image 911s is enlarged (911), and a first notification icon 912 indicating a current viewing angle may be displayed in the preview image 911s.

If the input device 200 is moved right and left in a 3D space within a reference range, when a touch input has been applied to the preview image 911 of which viewing angle is to be controlled, a viewing angle of the preview image 911 is changed to correspond to a movement of the input device 200. Accordingly, the preview image 911 is converted into a second preview image 911a, and the first notification icon 912 is converted into a second notification icon 912a indicating a changed viewing angle.

Then, if the input device 200 is pulled upward such that its spatial position is out of a reference range, when a touch input applied to the second preview image 911a is maintained, controlling a viewing angle of the second preview image 911a is completed (911s"), and information 901b on a play time of the second preview image 911a is displayed on a middle region of the video 901.

Upon completion of the control of viewing angles of preview images corresponding to a plurality of sections, the controller 180 can generate a single planar video by connecting sections corresponding to preview images having changed viewing angles to each other. For this, whenever a viewing angle at each section is completely controlled, the controller 180 can pre-store a preview image having the controlled viewing angle.

Figure 10:
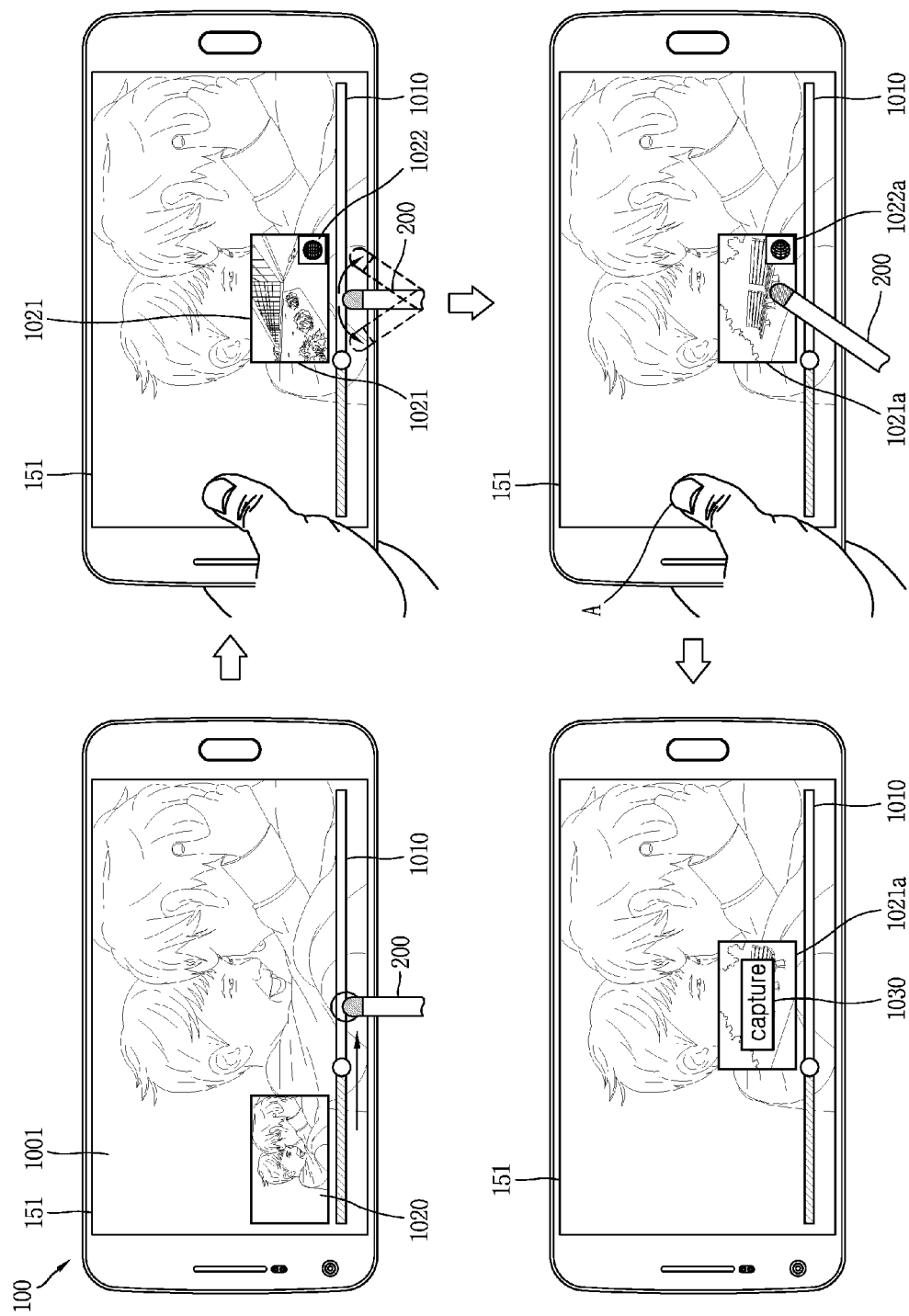

Next, FIG. 10 illustrates an example to input a capture command with respect to a corresponding preview image after a viewing angle of the preview image is controlled. As shown in FIG. 10, when a preview image 1020 at a play time point of a video 1001 is displayed as a touch input has been applied to a search bar 1020, if the input device 200 is moved right and left on the search bar 1020 or if the input device 200 is made to contact another point on the search bar 1020, the preview image 1020 is converted into a preview image 1021 at another play time point.

In the displayed state of the preview image 1021 at another play time point, if a touch input is applied to the touch screen 151 and then the input device 200 is moved or inclined in a rightward or leftward direction in a 3D space within a reference range, a viewing angle of the preview image 1021 is changed based on the movement of the input device 200 (1021a).

If a touch input is applied to the preview image 1021a having a changed viewing angle by using the input device 200, the controller 180 can execute a capture command with respect to the preview image 1021a having a changed viewing angle. While the capture command is executed, information indicating the execution of the capture command (e.g., 'capture) may be displayed in the preview image 1021a.

In addition, all viewing angles of a corresponding preview image may be simultaneously captured as a different touch input is applied to the original preview image 1021 or the preview image 1021a having a changed viewing angle. For instance, if a long touch input or a double-shot touch input is applied to the preview image 1021 or 1021a by using the input device 200, a plurality of images corresponding to all viewing angles of the corresponding preview image may be simultaneously captured.

Figure 11:
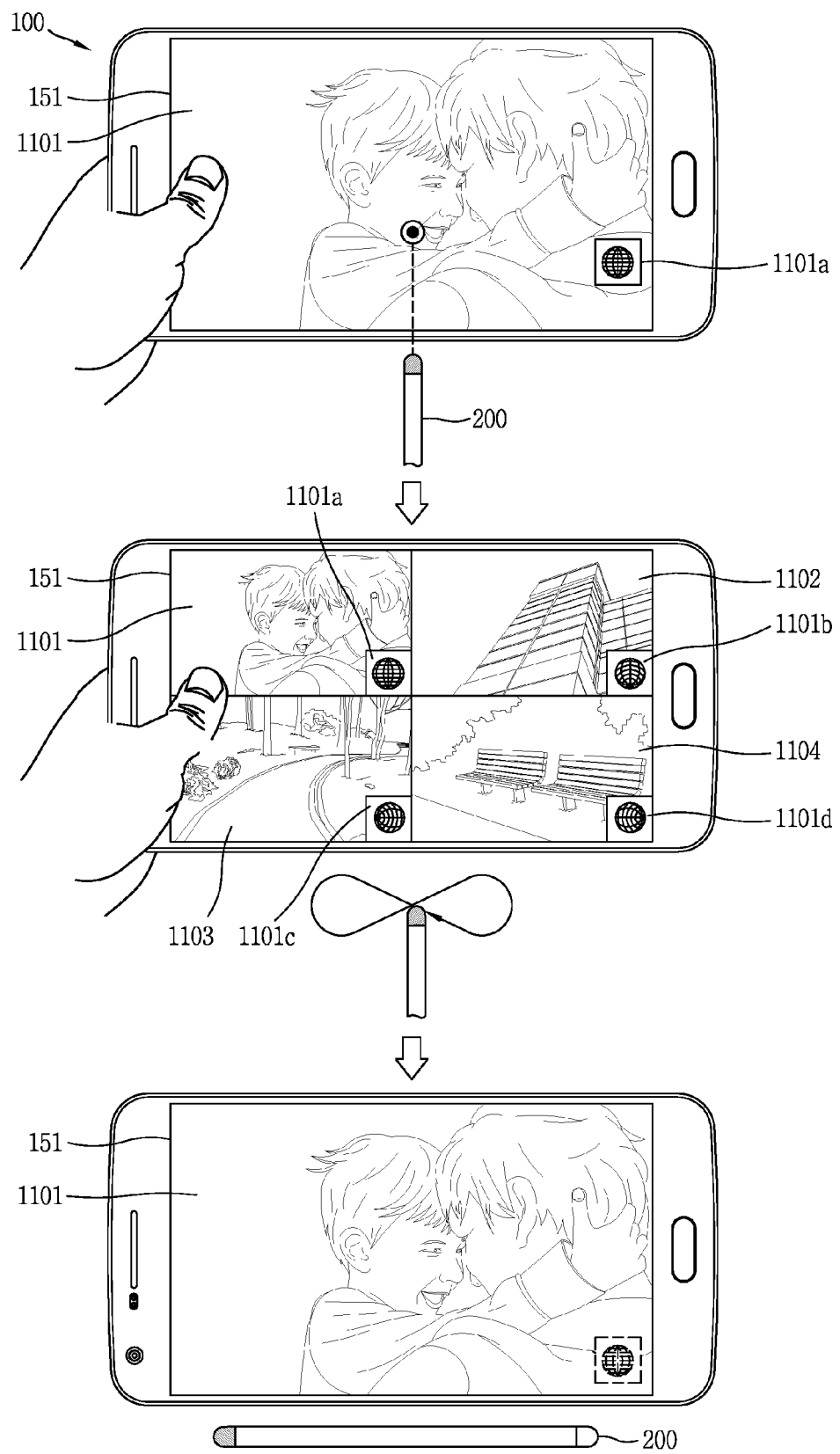

FIG. 11 is a view illustrating a method of viewing all viewing angles of a video being played at a time. In an embodiment, if a touch input is applied to a video being displayed rather than a search bar in S20 of FIG. 5, and if a preset gesture input is applied by using the input device 200, the controller 180 can execute an all-viewing angle mode with respect to the video.

More specifically, as shown in FIG. 11, if a touch input is applied to a video 1101 being played and captured at 360° by using the input device 200 and then the input device 200 is pulled upward based on a Z-axis, the controller 180 can enter an operation mode for controlling a viewing angle of the video 1101. Accordingly, a notification icon 1101a indicating a current viewing angle of the video 1101 may be displayed on a lower end of the touch screen 151. In the operation mode for controlling a viewing angle of the video 1101, the play state of the video 1101 is maintained.

If the input device 200 is moved in a 3D space within a reference range in the displayed state of the notification icon 1101a, the viewing angle of the video 1101 is controlled to correspond to the movement of the input device 200. If it is determined that a user applies a preset gesture input using the input device 200 (e.g., a gesture drawing a shape such as ∞ in upper, lower, right and left directions) when a touch input has been applied to the touch screen 151, the controller 180 can execute an all-viewing angle mode with respect to the video 1101 being played and captured at 360°.

In the all-viewing angle mode, a plurality of videos having different viewing angles with respect to the single video 1101 captured at 360°, are simultaneously played on the touch screen 151. As a result, as shown in FIG. 11, a plurality of images 1101, 1102, 1103, 1104 for playing the single video 1101 captured at 360° at different viewing angles, are displayed on a plurality of regions of the touch screen 151. And notification icons 1101a, 1101b, 1101c, 1101d indicating viewing angles are displayed on the images 1101, 1102, 1103, 1104, respectively.

In the all-viewing angle mode, if the input device 200 is out of a reference range, one of the plurality of displayed images is selectively played. More specifically, if a touch input is applied to one of the plurality of displayed images before the input device 200 is out of a reference range, the touched image is played on the entire region of the touch screen 151. Further, if the input device 200 is out of a reference range after a touch input applied to the touch screen 151 is released, the video 1101 corresponding to the original viewing angle before the all-viewing angle mode is executed, is played on the entire region of the touch screen 151.

Figure 12:
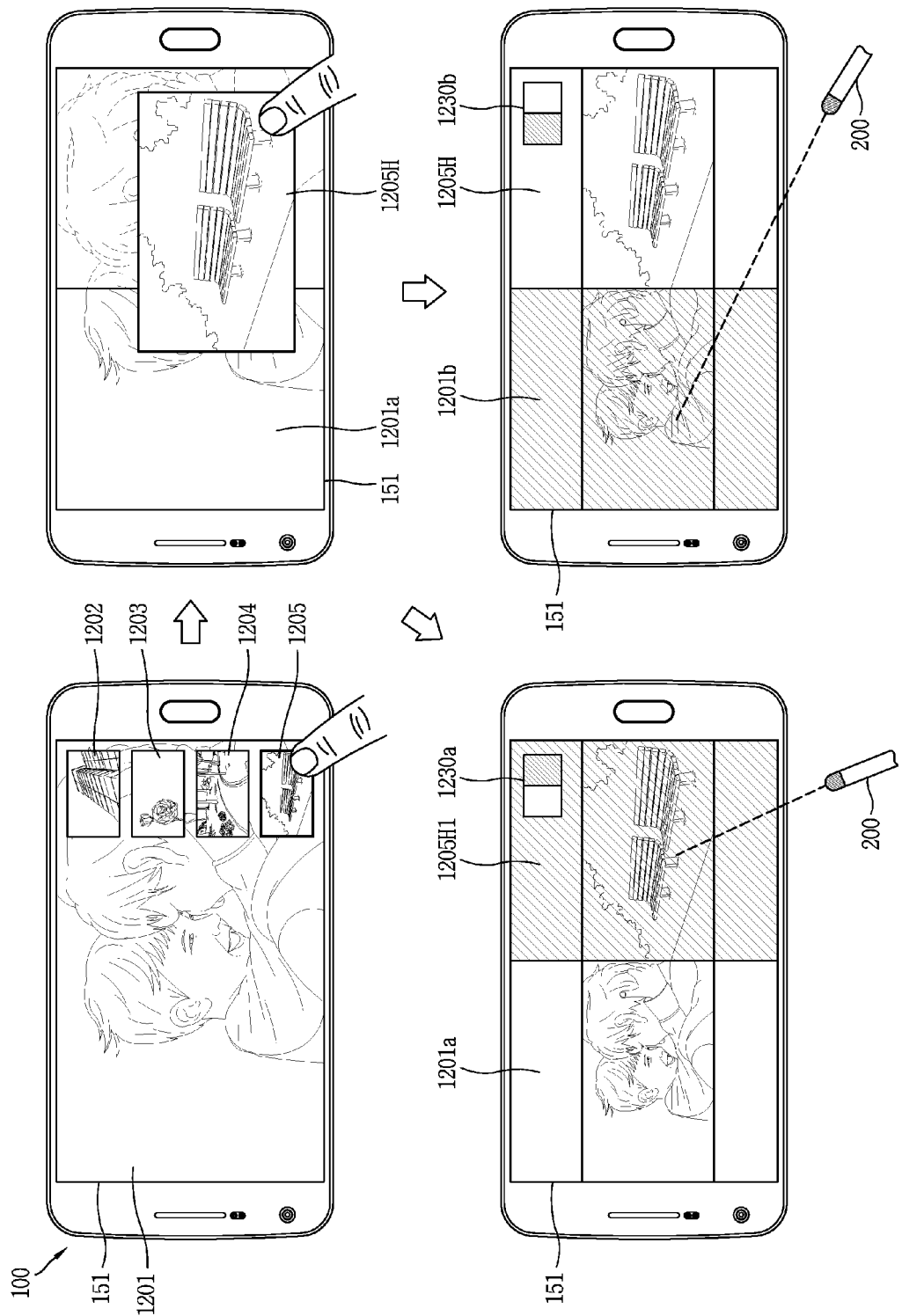

Then, the mobile terminal 100 of the present invention may display different videos captured at 360° on the touch screen 151 in the form of dual screens, according to a user's manipulation. For instance, as shown in FIG. 12, while a first video 1201 is being played on the touch screen 151, if one of related videos 1202, 1203, 1204, 1205 is selected, the selected second video 1205 may be displayed with the first video 1201 in the form of dual windows (1201a, 1205H).

In this instance, viewing angles of the first video 1201a and the second video 1205H may be controlled independently. For instance, as shown in FIG. 12, if a reference point on the touch screen 151 corresponding to a spatial position of the input device 200 is positioned on a play region of the first video 1201a, the controller 180 can independently control a viewing angle of the first video 1201a based on a movement of the input device 200 (1201b). In this instance, a first graphic object 1230b indicating the first video 1201a of which viewing angle is to be controlled may be displayed on one region of the touch screen 151, i.e., a right upper end of the touch screen 151.

As aforementioned, the reference point means a position on the touch screen 151 specified based on an initial spatial position of the input device 200. Here, a viewing angle of the video is controlled to correspond to movement information of the input device 200, based on the reference point. The initial spatial position of the input device 200 means a spatial position of the input device 200 when the input device 200 enters an operation mode for controlling a viewing angle of a specific video, or a spatial position of the input device 200 at a time point when the first graphic object 1230b has been displayed.

For instance, if the reference point on the touch screen 151 corresponding to a spatial position of the input device 200 is positioned on a play region of the second video 1205H, the controller 180 can independently control a viewing angle of the second video 1205H based on a movement of the input device 200 (1205H1). As an object of which viewing angle is to be controlled is changed, the first graphic object 1230b is converted into a second graphic object 1230a indicating the second video 1205H of which viewing angle is to be controlled.

In another embodiment, an object of which viewing angle is to be controlled may be determined according to whether an end part of the input device 200 close to the touch screen 151 has been changed or not, not according to a position of the reference point. For instance, if one end of the input device 200 is close to the touch screen 151, a viewing angle of the first video 1201a may be independently controlled. Further, if another end of the input device 200 is close to the touch screen 151, a viewing angle of the second video 1205H may be independently controlled.

For this, one end of the input device 200 close to the touch screen 151 or a change of the one end may be sensed according to whether a magnetic field sensed by the plurality of 3-axis magnetic sensors 143a, 143b of the mobile terminal 100 has been changed or not. And the controller 180 can control the second video 1205H in a different manner from the previous video (the first video 1201a).

Figure 13:
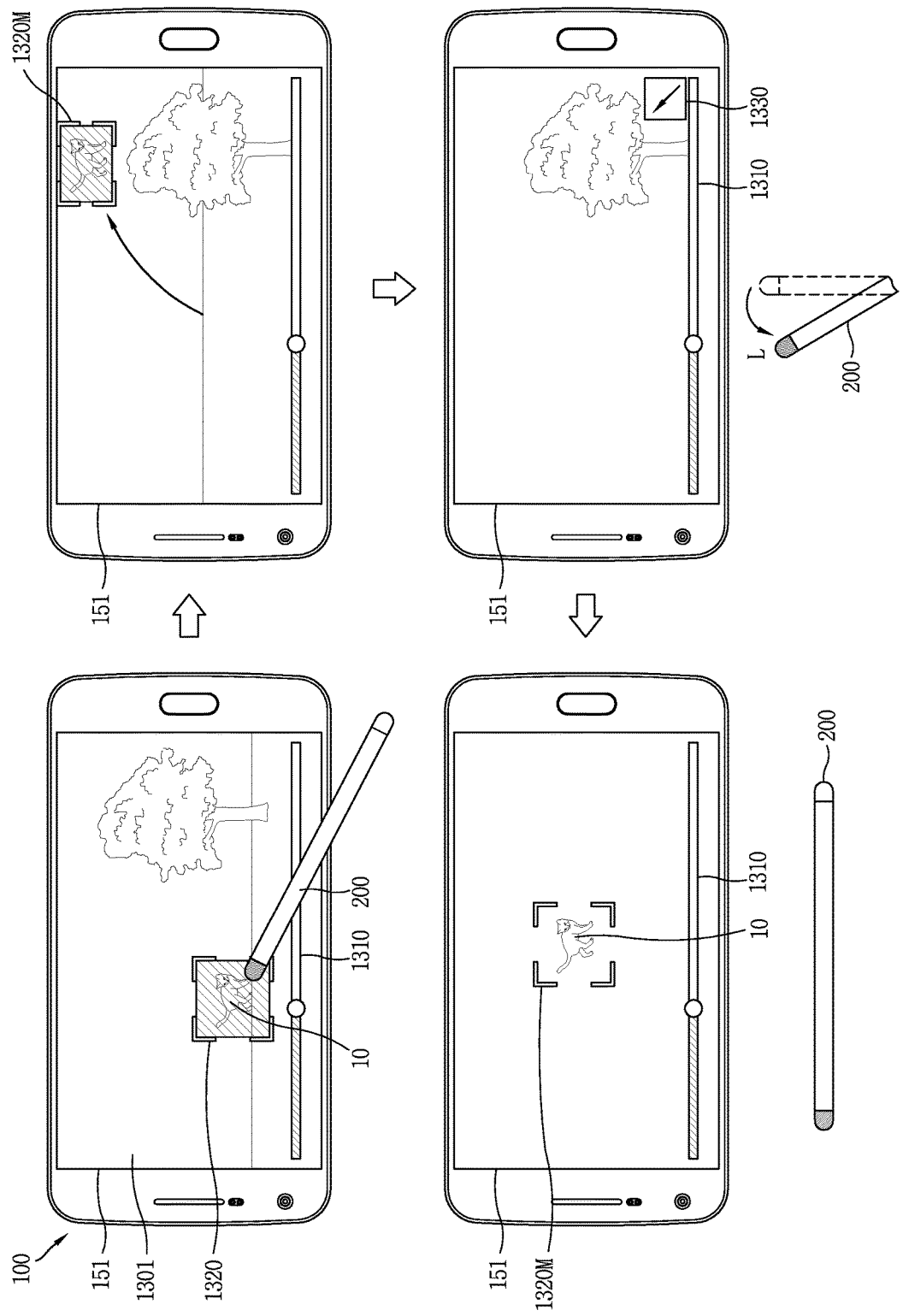

As another embodiment, FIG. 13 illustrates an example to control a viewing angle of a video captured at 360° based on a specific object. Referring to FIG. 13, while a video 1301 captured at 360° is being played on the touch screen 151, a specific object 10 (e.g., a cat) included in the video 1301 may be selected by using the input device 200. Then, an indication corresponding to the selection (e.g., a box image 1320) is continuously displayed near the object.

If the specific object 10 is spontaneously moved while the video 1301 is being played, or if a position of the specific object 10 is passively changed as a viewing angle of the video 1301 is controlled, the box image 1320 is displayed together with the specific object 10 (1320M). If the specific object 10 disappears from the video 1301, i.e., if the specific object 10 is out of a current viewing angle, a graphic object 1330 indicating a current position of the specific object 10 is displayed on one region of the touch screen 151, i.e., a right region above a search bar 1310. For instance, the graphic object 1330 may be a directional image indicating a current position of the specific object 10 as shown in FIG. 13.

In the displayed state of the graphic object 1330, if the input device 200 is moved to correspond to the current position of the specific object 10 indicated by the graphic object 1330 (e.g., if the input device 200 is inclined to the left side (L) by a predetermined angle), the current viewing angle of the video 1301 is changed to another viewing angle corresponding to the movement of the input device 200 (e.g., another viewing angle corresponding to a position of the specific object 10). Then, even if the input device 200 is released or is pulled upward out of a reference range, the changed viewing angle is maintained.

In the aforementioned embodiments, it is assumed that the input device 200 is pulled upward based on a front surface of the touch screen 151. However, the present invention is not limited to this. That is, the input device 200 may be backward pulled based on a rear surface of the mobile terminal 100, within a reference range where a spatial position of the input device 200 is detectable.

The present invention has the following advantages. First, a spatial position of the input device 200 can be precisely recognized by merely using the plurality of 3-axis magnetic sensors of the mobile terminal 100. Further, a viewing angle of a preview image at a specific play time of a video captured at 360° may be rapidly checked based on a movement of the input device. Further, a current viewing angle may be easily changed into another desired viewing angle.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a touch screen configured to display a video and a search bar for searching the video;
a plurality of magnetic sensors configured to sense a spatial position of an input device including a magnetic field generator; and
a controller configured to:
in response to a first touch input applied to the search bar using the input device, display a preview image at a play time point corresponding to the first touch input on the touch screen, and
change a viewing angle of the preview image based on the sensed spatial position of the input device indicating the input device is pulled away from the touch screen and spatially moved with respect to the touch screen.

2. The mobile terminal of claim 1, wherein when the sensed spatial position indicates the input device changes an inclination direction and a degree with respect to the touch screen, the controller is further configured to change the viewing angle of the preview image to display a different region of the preview image based on the inclination direction and the degree of the input device.

3. The mobile terminal of claim 1, wherein the controller is further configured to:
display a notification icon on the touch screen indicating a current viewing angle of the preview image, and
change an image of the notification icon in response to the viewing angle of the preview image being changed based on the sensed spatial position of the input device.

4. The mobile terminal of claim 1, wherein the controller is further configured to:
maintain a display state of the preview image in response to a second touch input being applied to the touch screen after the first touch input, and
change the viewing angle of the preview image based on the changing spatial position of the input device while the second touch input is applied to the touch screen.

5. The mobile terminal of claim 4, wherein the controller is further configured to:
in response to the second touch input being released, fix the viewing angle of the preview image corresponding to a time point when the second touch input is released.

6. The mobile terminal of claim 4, wherein the controller is further configured to:
in response to the second touch input being released, change a viewing angle of the displayed video based on the changing spatial position of the input device.

7. The mobile terminal of claim 6, wherein the controller is further configured to:
store, in a memory, information on the viewing angle of the displayed video corresponding to the spatial position of the input device at a time point when the second touch input is released, and
in response to a preset gesture input by the input device while the viewing angle of the displayed video is changed, convert the viewing angle of the displayed video in correspondence to the stored information.

8. The mobile terminal of claim 1, wherein the controller is further configured to:
determine a first viewing angle corresponding to the spatial position of the input device,
change a display state of the preview image in correspondence to the determined first viewing angle, and
determine a second viewing angle corresponding to a next spatial position of the input device, based on the spatial position of the input device corresponding to the first viewing angle.

9. The mobile terminal of claim 1, wherein the controller is further configured to:
in response to the input device being fixed to one point within a reference range for a predetermined time when the preview image is displayed, generate a trigger signal for controlling the viewing angle of the preview image.

10. The mobile terminal of claim 1, wherein the controller is further configured to:
bookmark the video at a time point corresponding to the preview image, in response to a rotation of the input device in one direction when a second touch input has been applied to the touch screen.

11. The mobile terminal of claim 10, wherein the controller is further configured to:
in response to the input device moving out of the reference range after the rotation is completed, completing the bookmark operation, and
in response to a bookmarked time point being reached while displaying the video, display an indicator indicating the bookmarked image on the touch screen.

12. The mobile terminal of claim 1, wherein the controller is further configured to:
in response to the spatial position of the input device being moved out of the reference range while a second touch input applied to the touch screen is maintained, fix the viewing angle of the preview image as a changed viewing angle, and
in response to the spatial position of the input device being moved out of the reference range while the second touch input applied to the touch screen is released, convert the preview image into an image corresponding to an original viewing angle.

13. The mobile terminal of claim 1, wherein the controller is further configured to:
in response to viewing angles of a plurality of preview images being changed by the input device, connect play sections corresponding to the preview images having the changed viewing angles to each other, and generate a single planar video.

14. The mobile terminal of claim 1, wherein the controller is further configured to:
    in response to a touch input being applied to the preview image using the input device when the viewing angle of the preview image has been changed, execute a capture command with respect to the preview image having the changed viewing angle.

15. The mobile terminal of claim 1, wherein the controller is further configured to:
    in response to a touch input being applied to the video and a predetermined gesture input being executed with the input device, execute an all-viewing angle mode with respect to the displayed video, and
    wherein in the all-viewing angle mode, a plurality of videos having a plurality of different viewing angles are simultaneously displayed on the touch screen.

16. The mobile terminal of claim 15, wherein the controller is further configured to:
    in response to the input device being moved out of the reference range in the all-viewing angle mode, selectively play one of the plurality of videos.

17. The mobile terminal of claim 1, wherein the controller is further configured to:
    play a plurality of videos on a plurality of regions of the touch screen, and
    independently adjust a viewing angle of one of the plurality of videos, based on the sensed spatial position of the input device.

18. The mobile terminal of claim 1, wherein the controller is further configured to:
    in response to an object included in the video being selected by the input device, display a graphic object indicating a position of the selected object on the touch screen, and
    in response to the input device moving in correspondence to the graphic object, changing a viewing angle of the video such that the object is displayed on one region of the video.

19. A method of controlling a mobile terminal, the method comprising:
    displaying, via a touch screen, a video and a search bar for searching the video;
    sensing, via a plurality of magnetic sensors, a spatial position of an input device including a magnetic field generator;
    in response to a first touch input applied to the search bar using the input device, displaying a preview image at a play time point corresponding to the first touch input on the touch screen; and
    changing, via a controller, a viewing angle of the preview image based on the sensed spatial position of the input device indicating the input device is pulled away from the touch screen and spatially moved with respect to the touch screen.

20. The method of claim 19, wherein when the sensed spatial position indicates the input device changes an inclination direction and degree with respect to the touch screen, the method further comprises changing the viewing angle of the preview image to display a different region of the preview image based on the inclination direction and degree of the input device.

* * * * *